United States Patent
Krempel (10) Patent No.: US 7,347,060 B2
(45) Date of Patent: Mar. 25, 2008

(54) SYSTEMS FOR REGULATING THE TEMPERATURE OF A HEATING OR COOLING DEVICE USING NON-ELECTRIC CONTROLLERS AND NON-ELECTRIC CONTROLLERS THEREFOR

(75) Inventor: Benjamin J. Krempel, San Francisco, CA (US)

(73) Assignee: Aqueduct Medical, Inc., San Francisco, CA (US)

( * ) Notice: Subject to any disclaimer, the term of this patent is extended or adjusted under 35 U.S.C. 154(b) by 245 days.

(21) Appl. No.: 10/852,762

(22) Filed: May 21, 2004

(65) Prior Publication Data

US 2005/0103041 A1    May 19, 2005

Related U.S. Application Data

(63) Continuation-in-part of application No. 10/714,468, filed on Nov. 14, 2003, now abandoned.

(51) Int. Cl.
*F25B 29/00* (2006.01)
*F28F 27/00* (2006.01)
*F25D 3/12* (2006.01)

(52) U.S. Cl. .................... 62/383; 165/276; 165/277

(58) Field of Classification Search .............. 62/383, 62/3.2, 3.3, 3.6, 3.7; 165/267, 277, 96, 136, 165/185, 166
See application file for complete search history.

(56) References Cited

U.S. PATENT DOCUMENTS

| | | | |
|---|---|---|---|
| 2,991,627 A | 7/1961 | Suits | |
| 3,085,405 A | 4/1963 | Frantti | |
| 4,459,468 A | 7/1984 | Bailey | |
| 4,470,263 A | 9/1984 | Lehovec et al. | |
| 5,097,829 A | 3/1992 | Quisenberry | |
| 5,813,233 A | 9/1998 | Okuda et al. | |
| 5,895,418 A | 4/1999 | Saringer | |
| 6,006,524 A | 12/1999 | Park | |
| 6,074,414 A | 6/2000 | Haas et al. | |
| 6,125,636 A | 10/2000 | Taylor et al. | |
| 6,232,543 B1 | 5/2001 | Nagata | |
| 6,295,819 B1 * | 10/2001 | Mathiprakasam et al. | .... 62/3.3 |

* cited by examiner

Primary Examiner—Chen Wen Jiang
(74) Attorney, Agent, or Firm—Lumen Patent Firm, Inc.

(57) ABSTRACT

Described here are systems for regulating the temperature of a heating or cooling device without adjusting the input power. In general, the systems described here comprise a heating or cooling device and a controller. The heating or cooling device typically comprises a cold region and a hot region, there being a temperature difference between the two, and an input power. The controllers are configured to be placed in thermal contact with at least a portion of the cold region and at least a portion of the hot region, and are configured to create a path for heat exchange between the portions of the contacted hot and cold regions. The heat exchanged may be controlled and the temperature of the system may be user adjustable, or it may be automatically controlled.

18 Claims, 4 Drawing Sheets

SYSTEMS FOR REGULATING THE TEMPERATURE OF A HEATING OR COOLING DEVICE USING NON-ELECTRIC CONTROLLERS AND NON-ELECTRIC CONTROLLERS THEREFOR

RELATED PATENTS

This is a continuation-in-part of U.S. patent application Ser. No. 10/714,468, filed Nov. 14, 2003, now abandoned, entitled "Systems for Regulating the Temperature of a Heating or Cooling Device Using Non-Electric Controllers and Non-Electric Controllers Therefor" (pending), the entirety of which is incorporated by notice.

BACKGROUND

It is often desirable to regulate the temperature of a heating or cooling system. In this respect, controllers and control systems are commonly used. These controllers and controls systems help obtain, maintain, or change the temperature of the system. Typically, controllers for heating or cooling systems are electric in nature. These controllers are termed "electric" because they function by regulating or modulating some electrical aspect of the system, such as the system voltage, or the system power.

Thermostatic and steady-state electric controllers are among the most common types of controllers for thermoelectric module ("TEM") based heating or cooling systems. Compared to compressor driven refrigerators and resistive electric heaters, TEM based systems typically operate at higher currents and on DC rather than AC current. This has heretofore made traditional low-cost controllers such as bimetal thermostats, unacceptable for use as controllers for TEM based systems.

A thermostatic controller operates by maintaining a temperature between two temperature limits. That is, a thermostatic controller operates to control the temperature of a cooling system by turning on or off cooling power when certain temperatures are reached. For example, when the temperature of the system gets too high, the controller turns on the cooling power to cool the system down. When the lower temperature limit is reached, the cooling power is turned off, and this cycle repeats itself to maintain the system temperature within the upper and lower temperature limits. The difference between the two set temperature limits is known as the system's hysteresis.

A steady-state controller, on the other hand, is designed to continually hold a set-point temperature with very little variation. It is often the controller of choice when a system temperature must be maintained with a high degree of certainty. When the steady-state temperature is disrupted, (e.g., by a change in ambient conditions) the controller acts to quickly bring the temperature back to the steady-state temperature. Steady-state control is often achieved with some variant of a proportional controller.

Electromechanical devices such as bimetal snap disks or relays are typically not used to control the temperature of TEM based systems. This is because direct current switching leads to contact pitting and premature wear from arcing, and because the number of switching cycles of the mechanical component limits the life of the device. In addition, the hysteresis of an electromechanical system is often set undesirably large in order to avoid premature device failure. Furthermore, snap disks are difficult to incorporate into an adjustable set-point device. This has lead to an almost uniform adoption of electric controllers as necessary components of TEM based systems. Some devices employ an electric controller plus additional structural components for altering between heating and cooling modes. The selection of a suitable controller is often one of the biggest considerations when designing heating or cooling systems, especially since electrical controllers have proven to be very costly.

Accordingly, improved controllers and control systems capable of regulating the temperature of TEM based heating or cooling systems would be desirable.

SUMMARY

Described here are systems, controllers and methods for regulating the temperature of a heating or cooling device without adjusting the input power to the heating or cooling device. The controllers may be non-electric. For example, one described system comprises a heating or cooling device and a controller. The heating or cooling device comprises a cold region, a hot region, and an input power, there being a temperature difference between the cold and hot region. The heating or cooling device may comprise a thermoelectric module. The controller comprises a heat transfer pathway that contacts at least a portion of the hot region and at least a portion of the cold region of the heating or cooling device. The heat transfer pathway is further configured to create a path for heat exchange between the portion of the contacted hot region, and the portion of the contacted cold region. In this way, heat exchange may be controlled to regulate the temperature of one of the regions, resulting in a controlled region and a non-controlled region.

The controller regulates the temperature of a heating or cooling device without regulating the input power into the heating or cooling device. Thus, the input power may be constant, variable or controlled by the user. In one version, the input power is constant.

The heat transfer pathway may comprise a solid, liquid or gas, or any combination thereof. A solid heat transfer pathway may comprise a thermally conductive solid. Thermally conductive solids may be metals, including but not limited to: aluminum, copper, silver, and gold, or mixtures and combinations thereof. In some variations, the solid element has a thermal conductivity of at least 50 $(W)(m^{-1})(°C.^{-1})$.

A liquid heat transfer pathway may comprise a fluid circuit. A fluid circuit may comprise a channel containing a fluid, where the fluid can move within the channel at some flow rate. Fluids may include water or water-based solutions. In some versions, the fluid is water plus an additive, such as an anti-corrosive additive, lubricating additive, and/or additives having thermal properties. The flow of fluid within the fluid circuit may be controlled by a valve, such as an adjustable valve. The adjustable valve may be a thermostatic valve.

In one version of the system described herein, the system comprises a heating or cooling device and a fluid circuit. The heating or cooling device comprises a cold region, a hot region, and an input power, there being a temperature difference between the cold and hot region. The fluid circuit comprises a channel with a fluid therethrough, which is configured to be placed in thermal contact with at least a portion of the cold region and at least a portion of the hot region. The fluid circuit is further configured to create a path for heat exchange between the portion of contacted hot region and the portion of contacted cold region. In this way, the heat exchange may be regulated to control the temperature of one of the regions, resulting in a controlled region and a non-controlled region.

A gas heat transfer pathway may comprise a gas circuit. Gas circuits may comprise a pathway for gas to flow over at least a portion of the cold region and the hot region of the heating or cooling device. The gas passing over the hot and cold regions may be any gas, including but not limited to air.

In one version of the system described herein, the system comprises a heating or cooling device and a gas circuit. The heating or cooling device comprises a cold region, a hot region, and an input power. In this system, there is a temperature difference between the cold and the hot region, and gas flow over them. The controller is configured to alter the gas flow rate over one of the regions. In this way, heat is exchanged to the environment in a controlled manner to regulate the temperature of one of the regions, resulting in a controlled region and a non-controlled region.

The system describe herein may further comprise a thermostatic valve, which is thermally insulated from the non-controlled region and configured to be in thermal contact with at least a portion of the controlled region. Thermal contact between the thermostatic valve and the controlled region can be direct (in which the thermostatic valve contacts the controlled region) or indirect (in which the thermostatic valve contacts some thermal intermediary and the thermal intermediary contacts the controlled region). In one version the thermostatic valve may alter the heat transfer pathway by thermally expanding or contracting in response to the temperature of the controlled region. In one version the thermostatic valve may alter the heat transfer pathway by thermally expanding or contracting in response to the temperature of the heat transfer pathway. In some variations, the heat exchange between the non-controlled region and the controlled region is regulated, at least in part, by thermal expansion of the thermostatic valve. The temperature of the system may be user adjustable, or it may be automatically controlled.

Thermostatic valves include valves which may be actuated by thermal expansion. Examples of thermostatic valves compatible with the controller described herein include, but are not limited to: wax actuators, liquid-filled actuators, bimetals, springs and/or coils with known thermal expansion, and the like. Thermostatic valves as used herein may be proportional valves. Thermostatic valves may be 2-, 3-, or multiple-port valves.

A controller described herein for regulating the temperature of a heating or cooling device may comprise a heat transfer pathway configured to be placed in thermal contact with at least a portion of the cold region of a heating or cooling device and at least a portion of the hot region of a heating or cooling device. The heat transfer pathway may be further configured to create a path for heat exchange between a portion of the contacted cold region and the portion of the contacted hot region. The heat transfer pathway may be controlled to regulate the temperature of one of the regions, resulting in a controlled region and an uncontrolled region of the heating or cooling device.

Methods for controlling the temperature of a heating and cooling device without adjusting input power are also described herein. In one version, a method of controlling the temperature of a heating and cooling device comprises providing a heating or cooling device comprising a cold region, a hot region and an input power, and providing a heat transfer pathway in thermal contact with at least a portion of the cold region and at least a portion of the hot region. The heat transfer pathway is configured to create a path for heat exchange between the portion of the contacted hot region and the portion of the contacted cold region. The method further comprises regulating the heat transfer pathway to control the heat exchanged between the cold region and the hot region, so that one of the regions is controlled.

In one variation, a method of controlling the temperature of a heating or cooling device without adjusting the input power comprises: providing a heating or cooling device comprising a cold region, a hot region and an input power, and providing a fluid circuit in thermal contact with at least a portion of the cold region and at least a portion of the hot region. The fluid circuit is configured to create a path for heat exchange between the portion of the contacted hot region and the portion of the contacted cold region. The method further comprises providing a thermostatic valve configured to modify the path and flow rate of the fluid in at least a portion of the fluid circuit, and regulating the fluid circuit with at least the thermostatic valve to control the heat exchanged between the cold region and the hot region, so that one of the regions is controlled.

DETAILED DESCRIPTION

Described here are systems for regulating the temperature of a heating or cooling device without controlling the input power to the heating or cooling device. In particular, non-electric controllers are described. In general, the systems described here comprise a heating or cooling device and a controller. The heating or cooling device typically comprises a cold region and a hot region, there being a temperature difference between the two, and an input power. The controller is configured to be placed in thermal contact with at least a portion of the cold region and at least a portion of the hot region, and comprises a controllable path for heat exchange between the portions of the contacted hot and cold regions. In this way, the controller may regulate the temperature of a region of a heating or cooling device using the thermal state of the other region, resulting in a controlled region and a non-controlled region.

The controllers and systems for regulating temperature described herein are useful for any regulating the temperature of any thermal load. The temperature regulator systems described herein may be especially useful for therapeutic devices (e.g. in cold therapy devices, heating pads, cooling pads, etc), for industrial uses (e.g. in industrial chiller, cooling systems for machinery, cooling systems for lasers, etc), for electronics (e.g., PC cooling systems, microcircuitry cooling systems, etc.), as well as small or portable refrigerators.

Heating or Cooling Device

The heating or cooling device typically comprises a cold region and a hot region, there being a temperature difference between the two, and an input power. In one version, the heating or cooling device includes a thermoelectric module ("TEM"). Although a TEM is depicted as the heating or cooling device throughout the figures, any suitable thermal pump may be used with the systems described herein. The hot region and the cold region may include thermally conductive materials (e.g. metals) in thermal contact with the thermal pump. In general, the hot region and the cold region are insulated from direct contact with each other; contact between the two regions is typically regulated by a controller.

Controllers

Controllers described herein regulate the temperature of a heating or cooling device without controlling the input power to the heating or cooling device. In particular, non-electric controllers are described. As used herein, unless the context indicates otherwise, "control systems" may be used to describe the controller or the controller plus additional components, such as the heating or cooling device, a thermal load pathway, thermal exchange surface, and/or thermal load. Throughout this description, non-electric controllers are described; however electric controllers may also be used with the system, devices, and methods described and claimed herein.

The controller is configured to be placed in thermal contact with at least a portion of the cold region and at least a portion of the hot region of the heating or cooling device, and comprises a controllable path for heat exchange between the portions of the contacted hot and cold regions. In this way, the controller may regulate the temperature of a region of a heating or cooling device using the thermal state of the other region, resulting in a controlled region and a non-controlled region.

Controllers useful with the described systems may provide several advantages over the traditional electric controllers typically employed with thermal pumps such as TEM-based systems. For example, the non-electric controllers described herein may reduce electromagnetic interference compared with pulse-width modulation controllers or other electric controllers. In addition, the non-electric controllers may be capable of switching between cooling and heating systems without reversing the polarity across the TEM. This in turn may help to reduce the thermal cycling of the TEM and consequently, may result in a higher reliability of the TEM over time.

The controllers described herein may operate at a constant input power to a thermal pump such as a TEM, eliminating the need for switching the high DC current often used to power a TEM, and thereby extending the useful life of the TEM. The controllers described herein may also be made at a low cost, without sacrificing the high performance typically achieved with traditional electric controllers. Finally, the non-electric controllers described herein may be used for systems of varying wattage (input power) without requiring resizing of the controller and/or heat pump, unlike electrical controllers.

The controllers include a heat transfer pathway that may be configured in different ways. For example, a heat transfer pathway may employ solids, liquids, gases, or some combination thereof, in order to aid in the transferring of heat. A solid heat transfer pathway may be a thermally conductive solid. A liquid heat transfer pathway may comprise a fluid circuit, for example, a channel containing a fluid, where the fluid can move within the channel at some flow rate. A gas heat transfer pathway may comprise a gas circuit, for example, a pathway for gas to flow over at least a portion of the cold region and the hot region of the heating or cooling device.

The control systems described herein may be useful for heaters or as coolers. The difference between the heating and cooling system is typically dependent upon, for example, the configuration of the output side, and the region that the controller references in regulating the system temperature.

The controller may be regulated manually, automatically, or both manually and automatically. When the controller is at least partially automatically controlled, it may include an adjustable valve and/or a proportional valve to adjust the heat transfer pathway. Any temperature-sensitive valves may be used as an adjustable valve. For example, an electrical valve (e.g. solenoid valves) may be used. A solenoid may be controlled by a temperature sensing electrical component (e.g. a thermistor, etc.). In response to temperature, the temperature sensing component opens or closes the valve, preferably in a proportional fashion. Other temperature-sensing valves may be used, including but not limited to thermostatic valves and thermistor valves.

In one version, the adjustable valve is a thermostatic valve. A thermostatic valve is a component which responds to a change in temperature by exerting a force by thermal expansion and/or contraction. A thermostatic valve incorporates a thermostatic actuator which drives the valve to open or close. Examples of thermostatic actuators may include, but are not limited to: wax actuators, liquid-filled actuators, bimetals, springs and/or coils with known thermal expansion, and the like. As used herein, unless the context makes clear otherwise, the term "thermostatic actuator" refers to a thermostatic valve comprising a thermostatic actuator. The temperature sensing region of the thermostatic valve may be isolated from the actuating region.

A thermostatic valve may operate by increasing or decreasing the contact between a heat transfer pathway and a heating or cooling device. In one version, the thermostatic valve moves a heat transfer pathway so that the heat transfer pathway contacts more of a cold, or a hot, or a cold and a hot region of a heating or cooling device. In one version the thermostatic valve increases or decreases the flow of a liquid in at least a region of a fluid circuit. In one version the thermostatic valve increases or decreases the flow of a gas within at least a region of a gas circuit. A thermostatic valve may increase or decrease contact between a heat transfer pathway and a heating or cooling device in proportion to temperature by thermal expansion. Thus, a thermostatic valve may be a proportional valve.

A proportional valve includes any valve which is configured to allow the passage of a regulatable amount of material pass. A thermostatic valve may be configured as a proportional thermostatic valve. Thus, for example, a proportional thermostatic valve regulates the passage of a material (e.g. a liquid) in response to temperature. A thermostatic valve may respond to a change in temperature in a graded manner (e.g. thermally expanding or contracting more or less as temperature changes) or in an all-or-nothing fashion (e.g. a phase change).

Figure 1A:
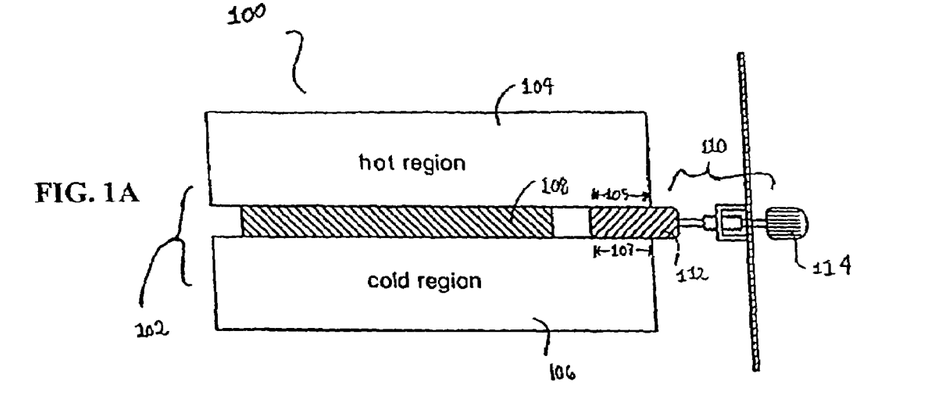
FIGS. 1A-1C are illustrative depictions of systems for regulating the temperature of a heating or cooling device where solids are used to transfer heat.
Figure 1B:
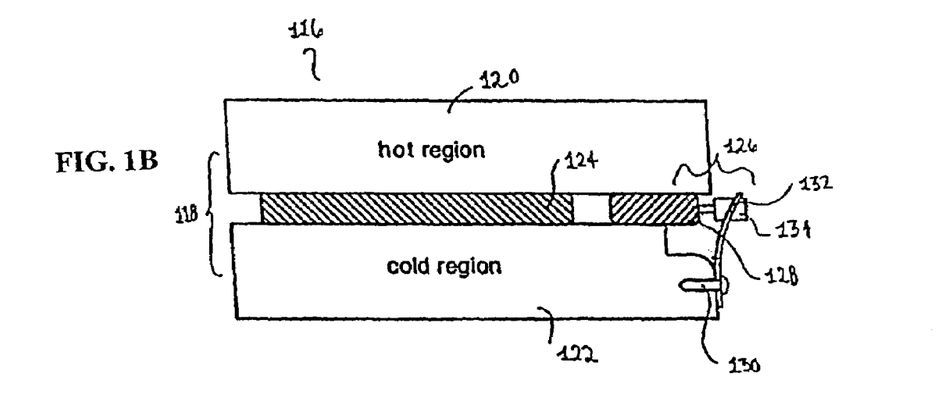
Figure 1C:
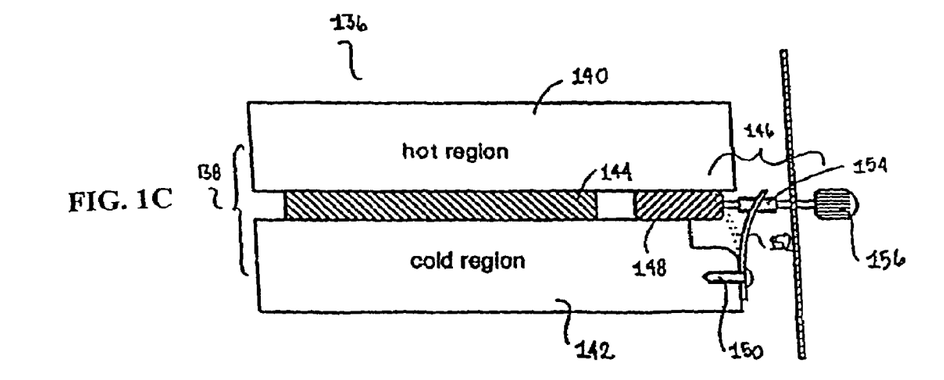

Turning now to the drawings, wherein like numerals indicate like elements throughout the views, there is shown in FIGS. 1A-1C control systems in which the hot and cold regions are controlled by a solid heat transfer pathway.

As shown in FIG. 1A, the control system (100) comprises a refrigeration device (102), and a controller (110). The refrigeration device (102) comprises a hot region (104), a cold region (106), and a TEM (108). As noted, although a TEM is depicted in these figures, any suitable thermal pump may be used with the control systems described herein. The controller comprises a heat transfer pathway, shown as a thermally conductive element (112), which is configured to be placed in thermal contact with at least a portion of the cold region (106) and at least a portion of the hot region (104).

The hot region (104) may be made from any number of suitable materials. For example, it can be made from a highly conductive material, capable of dissipating heat, such as certain metals. Suitable metals include, but are not limited to, aluminum, copper, and mixtures thereof The cold region (106) may similarly be made from any number of suitable materials, for example, it may be made of a highly conductive material, or made of a material capable of functioning as a heat sink. Suitable metals include, but are not limited to, aluminum, copper, and mixtures thereof. The hot and cold regions may be of any suitable dimension, which is typically dependent on the overall system size. In this way, the heat pumped through the system may be transferred. The hot region (104) and cold region (106) may also be configured to be reversible in some capacity.

The solid heat transfer pathway (112) depicted in FIG. 1A may take on any number of configurations. In FIG. 1A, heat transfer pathway (112) is shown as a manual slide, or a block. However, heat transfer pathway (112) need not take such form. Indeed, any geometry permitting heat transfer pathway (112) to be placed in thermal contact with at least a portion of the hot region (104) and at least a portion of the cold region (106) may be suitable.

Similarly, the heat transfer pathway (112) may be made from any suitable material. Suitable materials include any thermally conductive material. For example, the heat transfer pathway may comprise a metal or a mixture of metals. Materials of high thermal conductivity are particularly useful. Suitable metals include aluminum, copper, silver, gold, and the like. In some variations it may be desirable that the heat transfer pathway has a thermal conductivity of at least $50(W)(m-1)(°C.-1)$. The heat transfer pathway (112) is configured to be placed in thermal contact with at least a portion of the cold region (106) and at least a portion of the hot region (104) and to create a path for heat exchange between the portion of contacted hot region (105) and the portion of contacted cold region (107). In this way, heat transfer pathway (112) creates a path for heat to flow from the hot region (104) to the cold region (106) in order to regulate the system temperature. Typically, the extent of heat transfer between the two regions is dependent upon the extent of surface area contact between heat transfer pathway (112) and the hot (104) and cold (106) regions. Accordingly, heat transfer pathway (112) is often movable, so that it can be moved or positioned to have greater or lesser surface area contact with the hot (104) and cold (106) regions.

For example, when heat transfer pathway (112) is moved into contact with the hot region (104) and the cold region (106), the thermal resistance of the system is decreased, allowing heat to transfer ("flow") from the hot region to the cold region. The greater the contact between the hot and cold regions and the heat transfer pathway, the greater the heat that gets transferred. The system (100) shown in FIG. 1A is user adjustable. That is, a user may turn the adjustment control knob (114) to adjust the position of heat transfer pathway (112). In this way, the system output (derived from the controlled region) may be made hotter or colder and the temperature of the system regulated. It should be noted, however, that while the system of FIG. 1A is capable of providing for a range of temperatures, the range will typically be relative to the ambient temperature or the temperature of the surrounding environment. Therefore, the user would be able, for example, to make the system temperature cold, colder, or coldest in the case of a cooler, and hot, hotter, or hottest in the case of a heater.

FIG. 1B shows another control system (116) where the temperature is automatically controlled using a thermostatic valve. As shown in FIG. 1B, control system (116) comprises a refrigeration device (118) and a controller (126). The refrigeration device comprises a hot region (120), a cold region (122), and a TEM (124). Again, while a TEM (124) is depicted, any suitable thermal pump may be used. The controller (126) comprises a heat transfer pathway (128), a securing screw (130), a thermostatic valve (132), and a thermostatic valve adjuster (134). In FIG. 1B the thermostatic valve is depicted as a strip of bimetal.

The bimetal strip (132) may be made out of any suitable bimetal, i.e., any material comprising two different metals having different coefficients of thermal expansion, which are bonded together. The bimetal industry is a mature one having certain standards (e.g., ANSI standard, etc.), and any of these known industry bimetals, for example, are acceptable. The bimetal threaded adjuster may be made of any material, for example, stainless steel. However, in some instances it may be desirable for the threaded adjuster to be made of an engineering polymer, or some other thermal insulator, so as not to alter the bimetal temperature.

The bimetal strip (132) is configured to connect to, or otherwise configured to facilitate movement of, heat transfer pathway (126). In this way, expansion or contraction of bimetal strip (132) regulates the position of the heat transfer pathway (126) relative to the hot (120) and cold regions (122) to control the system temperature. That is, the bimetal strip (132) typically deforms at a measurable rate, as a function of its temperature throughout its effective range, due to the thermal expansion of the bimetal and the chosen bimetal properties. Typically, the bimetal strip (132) is thermally insulated from the non-controlled region and is configured to be placed in thermal contact with at least a portion of the controlled region. Other variations of thermostatic valves may be similarly configured. Thus, for example, a thermostatic valve comprising a wax which expands or contracts based on a change in temperature may be used to move a plunger connected to the heat transfer pathway (126) and thereby control the temperature.

As noted above, the system to be regulated may be either a heating system or cooling system or a heating and cooling system. Illustratively depicted in FIG. 1B is a cooling system. In operation, for example, as the temperature of the cold region (112) changes, the bimetal expands or contracts to move the heat transfer pathway (128) in towards TEM (124). The contact of the heat transfer pathway (128) with hot region (120) and cold region (122) creates a path for heat exchange, allowing heat to transfer from hot region (120) to cold region (122). In this way, thermostatic valve (132) helps to control and regulate the temperature of the system. That is, unlike system (100) depicted in FIG. 1A, whose temperature regulation is dependent upon the ambient temperature, the system (116) of FIG. 1B has a fixed temperature which is controlled in a self-regulating, or automatic fashion.

Another control system (136) is depicted in FIG. 1C. The control system of FIG. 1C is similar to the control system (116) depicted in FIG. 1B, but system (136) has a user adjustment knob (156). The adjustment knob (156) allows a user to adjust the temperature within a set range of temperatures. The allowable temperature range is typically dictated by the selection of the thermostatic activator. In one version, the thermostatic activator and the allowable temperature range is based on the properties of the bimetal material used to make a bimetal strip (152).

The adjustment knob (156) of FIG. 1C, like the adjustment knob (114) of FIG. 1A, and the other knobs depicted throughout the figures, may be any acceptable knob, for example, the type of knob most commonly used as a radio dial. Indeed, structurally, the knobs may be any configuration capable of changing the position of heat transfer pathway (148) with respect to bimetal strip (152). Similarly, bimetal securing screws (130) and (150) may be made out of any material, for example, stainless steel or various engineering polymers. However, selection of metallic bimetal securing screws may help insure that the temperature of the bimetal is close to the reference temperature.

Figure 2A:
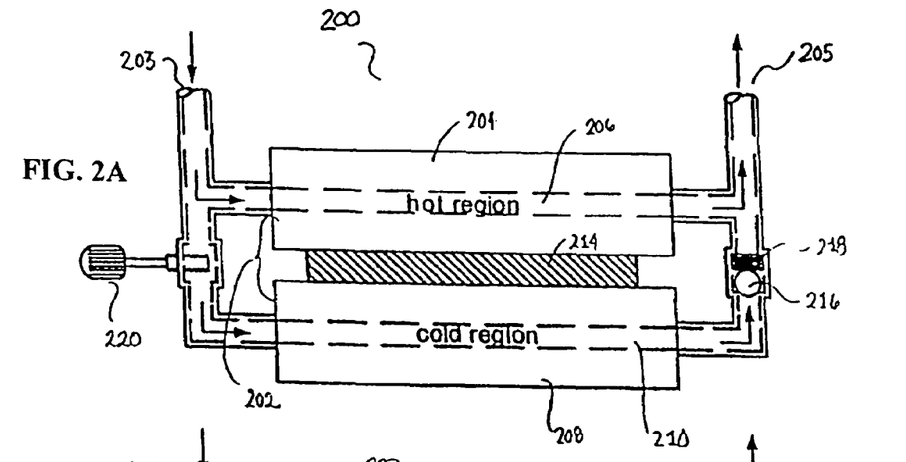
FIGS. 2A-2C are illustrative depictions of systems for regulating the temperature of a refrigeration device where liquids are used to transfer heat.
Figure 2B:
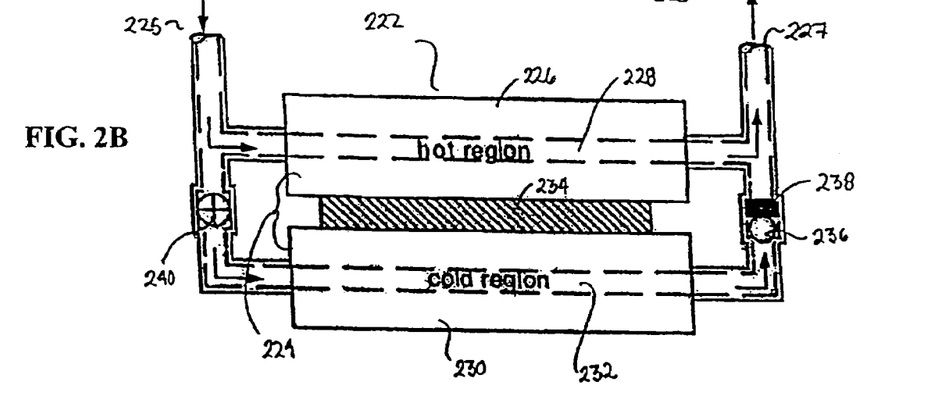
Figure 2C:
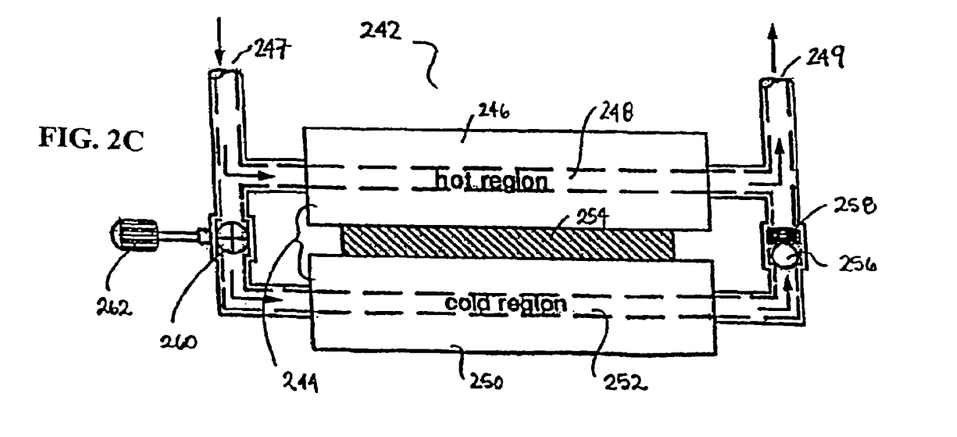

FIGS. 2A-2C depict systems in which the heat transfer pathway of the controller is a fluid circuit, where the hot and cold region junction employs a liquid to transfer heat. FIG. 2A shows a user adjustable system (200). As shown, the system (200) comprises a refrigeration device (202) and a fluid circuit. The refrigeration device comprises a hot region (204) having a fluid channel (206) passing therethrough, a cold region (208) having a fluid channel (210) passing therethrough, and a TEM (214). The system (200) shown in FIG. 2A also has a check valve (216) and a check valve spring (218).

The hot and cold regions are of the same type as those described in FIGS. 1A-C, and accordingly, as noted above, can be made of any suitable material and be of any suitable dimension. For example, the hot and cold regions may be made of a thermally conductive material, such as a metal. The fluid channels traversing through the hot and cold regions may carry any number of suitable fluids. In some variations, water is used in the fluid circuit. In some versions, the fluid is water plus an additive, such as an anti-corrosive additive, lubricating additive, and/or additives having thermal properties. The check valve may be any check valve useful in preventing the fluids from mixing when it is not desirable for them to do so. Similarly, the check valve should permit the fluids to mix when it is desirable for them to do so.

The fluid may flow through channels at a fixed or a variable rate. In some versions, the fluid is pumped at a fixed rate, and a manual or automatic valve (e.g. thermostatic valve) can alter the flow rate into the controlled or non-controlled region.

Another way that control system (200) may be operated is illustratively depicted in FIG. 2A. When the control valve (220) is completely closed, the fluid flows only through the hot region channel (206). That is, the fluid enters from input channel (203), flows through hot region channel (206), and then flows out through output channel (205). As noted above, the system may be used as a heater or a cooler, depending on the nature of its configuration. For example, the system may be configured such that input channel (203) and output channel (205) are connected to a pump, and optionally a radiator, and the system be made suitable as a cooler. In this variation, the cold region (208) could be the output side, and may be used, for example, like a cold plate (when the thermal load directly contacts the cold side) or be connected to a thermal exchange surface via a thermal load pathway. Conversely, if it were desirable to have hot region (206) as the output side, then system (200) could be configured as a heater. In this variation, for example, the flow out of the output side (205) could go to a thermal exchange pathway (e.g. a heating pad), or other heating or warming device.

Typically, the check valve (216) is actuated by pressure within system rather than by gravity. For example, if control valve (220) is completely closed, then the cold region (208) is typically at a lower pressure than the hot region (204). This pressure difference causes the check valve to prevent the fluid from mixing. Similarly, when the control valve (220) is opened, the pressure within the system equalizes and the check valve ball moves into spring (218) compressing it, creating a space. The space created by the spring compression allows the fluid to pass through, and therefore, mix together. That is, when check valve (216) is partially open, fluid flows in from input channel (203) and flows both through hot region channel (206) and cold region channel (210).

In this way, a user can regulate the temperature of the system by adjusting the control valve (220). For example, a user can heat up a system that is too cold, or the user can cool down a system that is too hot. However, without more components, the system depicted in FIG. 2A is typically not self regulating. Instead, the user controls only relative temperature (e.g., cold, colder, coldest in the case of a cooler, and hot, hotter, hottest in the case of a heater).

FIG. 2B illustrates a control system (222) having a fixed temperature set point. Thus, unlike the control system (200) of FIG. 2A where temperature is controlled in a relative fashion, the temperature of system in FIG. 2B, is regulated in an absolute fashion. Turning now to FIG. 2B, there is a refrigeration device (224), and a thermostatic valve (240). The refrigeration device comprises a hot region (226) having a fluid circuit (228) passing therethrough, a cold region (230) having a fluid circuit (232) passing therethrough, and a TEM (234). Also shown is check valve (236) and check valve spring (238).

The control system of FIG. 2B is similar in operation to the control system of FIG. 2A, however, in FIG. 2B, the temperature of the system is regulated, at least in part, by an adjustable valve, shown here as a thermostatic valve (240). The thermostatic valve (240) may be thermally insulated from the non-controlled region and configured to be placed in thermal contact with at least a portion of the controlled region. Thus, as shown in FIG. 2B, if it is desirable, to directly regulate the temperature of the cold region (230) the thermostatic valve (240) would be placed in thermal contact with cold region (230) to use it as a reference temperature. Similarly, the system may be modified so as to regulate the temperature of hot region (226) by placing the thermostatic valve (240) in thermal contact with hot region (226) so as to use the hot region (226) as a reference temperature.

In FIG. 2B the thermostatic valve is in direct thermal contact with either the cold region (230) or the hot region (226) of the refrigeration device. The thermostatic valve may be in contact with the heat transfer pathway and/or the thermal load pathway, thermal exchange surface, or thermal load. Thus, the thermostatic valve may regulate the temperature of a region of the refrigeration device indirectly. The temperature seen by the thermostatic valve determines the amount that the thermostatic valve is open or closed. In one version, the thermostatic valve is in thermal contact with the fluid in some portion of the fluid circuit that contacts the refrigeration device. Thus, the fluid temperature seen by the thermostatic valve is derived from either the hot or cold regions. As the temperature of the fluid changes, the thermostatic valve responds by regulating the flow of fluid within either the hot or cold regions of the refrigeration device. Thus, a thermostatic valve can be placed anywhere within the system and still regulate the temperature of one of the regions resulting in a controlled region and a non-controlled region.

Another control system is illustrated in FIG. 2C. Shown there is a control system involving aspects of both FIG. 2A and FIG. 2B. That is, the control system (242) provides a fixed temperature with an adjustable range. As shown in FIG. 2C, the system (242) comprises a refrigeration device (244) and a thermostatic valve (260). The refrigeration device comprises a hot region (246) having a fluid circuit (248) therethrough, a cold region (250) having a fluid circuit (252) therethrough, and a TEM (254). Also shown in FIG. 2C are a check valve (256), a check valve spring (258), and a user adjustment knob (262).

The control system (242) of FIG. 2C functions similarly to the control systems (222 and 200) previously described. That is, the check valve (256) is actuated by the pressure within the system and compression into check valve spring (258) creates a space for fluid to flow therethrough. The system (242) has a user adjustment knob (262) which allows the user to adjust the temperature of the system. The range of temperatures which the user can select is set by the thermostatic valve (260). Therefore, while the system is user adjustable, it is adjustable within a set range of temperatures, typically dictated by the material properties of the thermostatic valve (260).

One class of thermostatic valves compatible with this system are wax-based thermostatic valves. Wax-based thermostatic valves are manufactured with well-characterized thermal properties, permitting calibration of the set temperature, and configuration of the system.

Figure 3A:
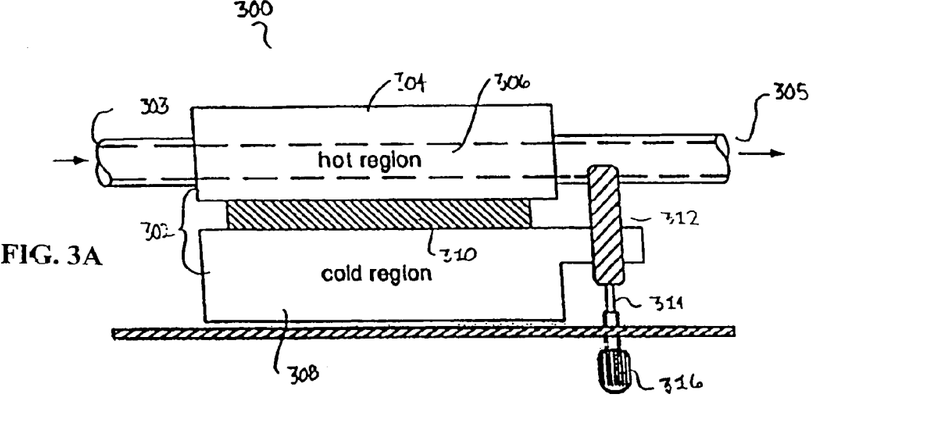
FIGS. 3A-3C are illustrative depictions of systems for regulating the temperature of a refrigeration device where both solids and liquids are used to transfer heat.
Figure 3B:
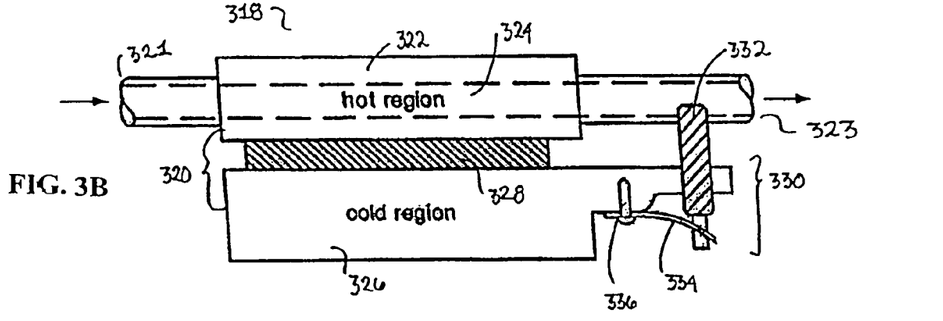
Figure 3C:
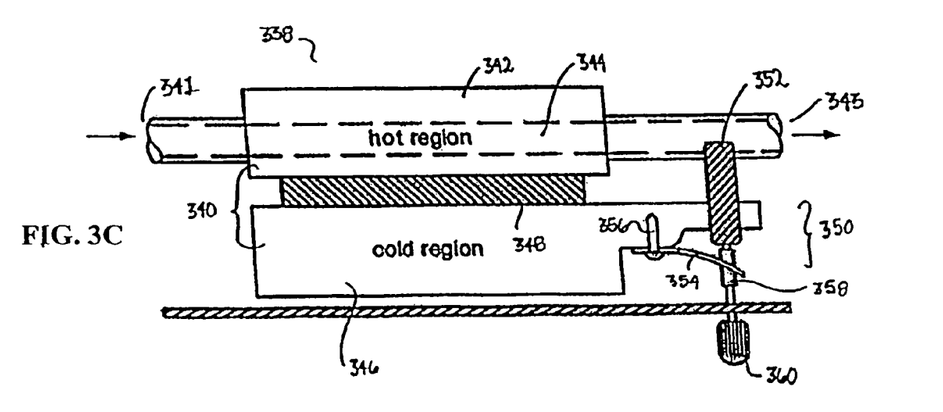

FIGS. 3A-3C illustrate other control systems for regulating the temperature of a refrigeration device, and therefore the temperature of a thermal exchange surface and/or thermal load. As shown therein, the hot and cold region junctions are regulated using both solids and liquids for the heat transfer pathway. For example, FIG. 3A shows a control system (300) comprising a refrigeration device (302), a hot region (304) having a fluid channel (306) therethrough, a cold region (308), and a solid element having a high thermal conductivity (312). Also shown is a user adjustment knob (316) and a mechanism (314) to connect the solid element (312) to the user adjustment knob (316), shown as a rod.

As noted above, the control systems described in FIGS. 3A-3C may be configured to operate as heaters or coolers, for example, by selecting the system output region or by selecting the reference region. That is, the output (e.g., a thermal exchange surface or a thermal load pathway) may be in thermal contact with either the cold or hot region of the system, depending on what is desirable. For example, if it is desirable to have the system output on the cold region, then the system can operate as a cooler. In this version, the temperature of the cold region could be regulated, e.g. to function as a "cold plate." This may be useful, for example, during food preparation or presentation, where it may be desirable to have a cold plate to regulate the temperature of perishables. In this variation, the input (303) and output (305) channels of hot region (304) could be connected to a pump, and an optional radiator or fan to remove heat from the hot region, thereby cooling down the system temperature.

Similarly, it may be desirable to have the system output on the hot region, allowing the system to function as a heater. In this version the input (303) and output (305) channels of hot region (304) could be connected to a heating pad, or other heating or warming device (via a thermal load pathway). In some variations a radiator may be desirable in order to transfer heat to, and therefore, heat up, the hot region. Again, while the fluid channel is depicted traversing through the hot region, it is also possible for a fluid channel to traverse through the cold region, and it should be understood that the systems described here are not so limited so as to exclude these variants.

One illustrative example of how control system (300) may be operated is depicted in FIG. 3A. As shown in FIG. 3A, solid element (312) is partially in contact with fluid channel (306). Movement of solid element (312) into and out of fluid channel (306) controls the heat exchange between the hot and cold region, and thus the system temperature. This movement can be controlled by a user by adjustment knob (316). As noted above, the knob (316) may be any knob suitable for facilitating movement of solid element (312) into, or out of, fluid channel (306).

As the user turns adjustment knob (316), solid element (312) is moved into the path of fluid flow in the fluid channel, thereby exposing more of a solid element's (312) surface area to the passing fluid. As more of the solid element's surface area gets exposed to the passing fluid, more heat gets transferred between the solid surface and the fluid. The solid element (312) can take any suitable configuration, and be made of any suitable material. In some variations, the solid element (312) is made out of a highly conductive material having an o-ring. In some variations, the solid element is made out of a metal selected from the group consisting of aluminum, copper, silver, and gold. Mixtures of metals or alloys may also be suitable. In some variations, the solid element has a thermal conductivity of at least $50(W)(m-1)(° C.-1)$.

Control system (318) of FIG. 3B illustrates a system similar to that of control system (300) of FIG. 3A, however, in FIG. 3B, the temperature of the system is regulated, at least in part, by thermal expansion of a thermostatic valve (334). As shown in FIG. 3B, the control system (318) comprises a refrigeration device (320), and a controller (330). The refrigeration device (320) comprises a hot region (322) having a fluid channel (324) therethrough, a cold region (326), and a TEM (328). The controller comprises a thermally conductive solid element (332), a thermostatic valve (334), and a securing screw (336).

In operation, the system of FIG. 3B functions in a similar fashion to the system of FIG. 3A, however, whereas the system of FIG. 3A is user controlled and operates only upon relative temperatures, the system of FIG. 3B is automatically controlled about a range of temperatures, which are typically determined by the selection of the thermostatic valve properties. As noted above in the description of the control systems of FIGS. 1B and 2B, the temperature of the system is regulated, at least in part, by thermal expansion of the thermostatic valve. The thermostatic valve shown in FIGS. 3B and 3C is a bimetal. As the thermostatic valve (e.g. a bimetal, wax, spring, etc.) (334) expands, it moves solid element (332) into the path of fluid flow, thereby effecting greater heat transfer.

FIG. 3C illustrates another variation of a solid-liquid control system, in which the temperature is user adjustable about a fixed set point. As shown in FIG. 3C, the control system (338) comprises a refrigeration device (340) and a controller (350). The refrigeration device (340) comprises a hot region (342) having a fluid channel (344) traversing therethrough, a cold region (346), and a TEM (348). The controller (350) comprises a thermally conductive solid element (352), a thermostatic valve (354), a securing screw (356), a user adjustment knob (360), and a thermostatic valve threaded adjuster (358).

The adjustment knob (360) allows a user to adjust the temperature of the system within a set range of temperatures, the range typically determined by the selection of the thermostatic valve used (354). As noted above, the adjustment knob (360) may be any acceptable knob. Similarly, a securing screw (356) may be made out of any suitable material, for e.g., the same material used to make securing screws (130) and (150).

Figure 4A:
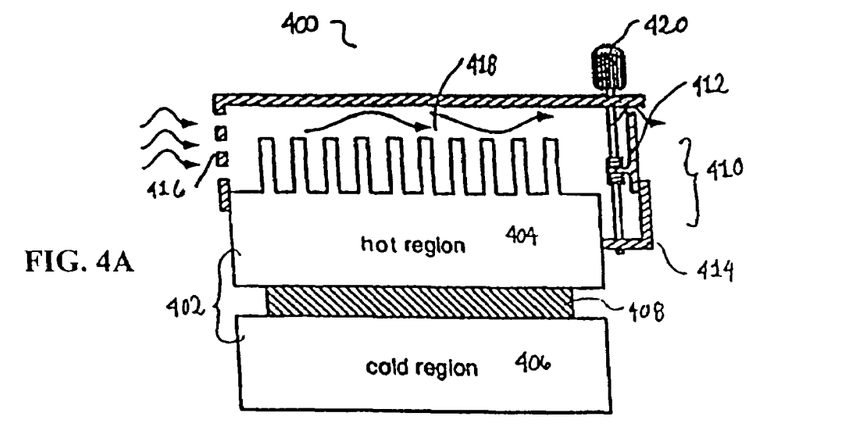
FIGS. 4A-4C are illustrative depictions of systems for regulating the temperature of a refrigeration device where both solids and gases are used to transfer heat.
Figure 4B:
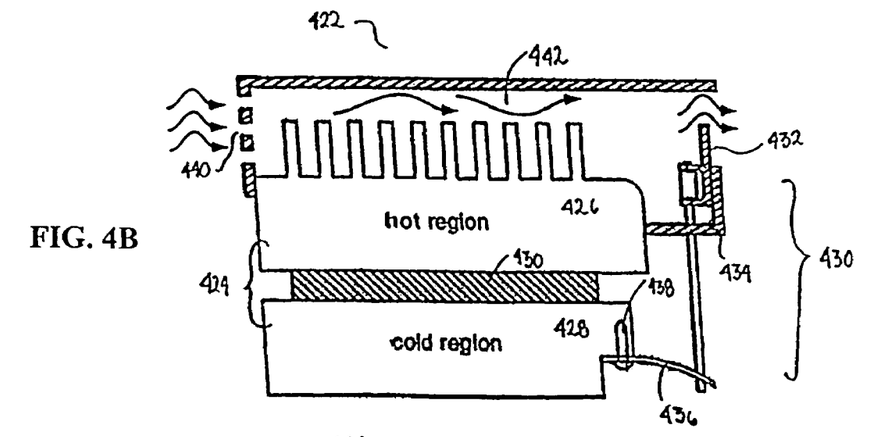
Figure 4C:
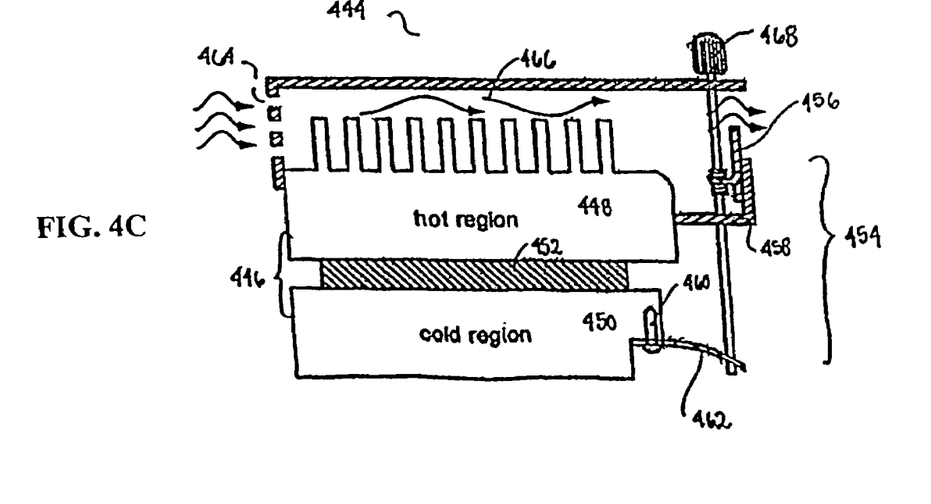

FIGS. 4A-4C illustrate control systems where a gas and a solid are used as the heat transfer pathway of the controller. That is, opposed to the systems described in FIGS. 3A-3C, which utilize fluids to dissipate heat, the hot region of the systems illustrated in FIGS. 4A-C, dissipate heat using a gas. A heat sink having a gaseous current running by it is illustratively depicted in FIGS. 4A-C.

Turning now to FIG. 4A, there is shown a user adjustable control system (400) comprising a refrigeration device, and a controller (410). The refrigeration device comprises a hot region (404), a cold region (406), and a TEM (408). The controller (410) comprises a vent door (412), and housing (414). Also shown in FIG. 4A is a user adjustment knob (420). Depicted in FIG. 4A is a heat sink (418), here in the form of a ridged structure as part of hot region (404). The vent door (412) is one type of adjustable valve.

In operation, the gas enters system (400) through opening (416), and exits on the right when vent door (412) is open. When the vent door (412) is closed, convection is restricted, and the gas flow cannot exit. Any number of suitable gases can be used with the systems described here. For example, the gas may be air, or some other inert gas. In the system depicted here, the rate of heat dissipation is regulated by controlling the path of the gas as it crosses hot region (404) and heat sink (418).

The user adjustment knob (420) controls the vent door (412). That is, as knob (420) is turned, the vent door (412) opens, and more gas is permitted to escape. If the knob is turned in the opposite direction, the vent door closes. In this way, the vent door is used to regulate the amount of gas flow exiting the system. Thermal conduction is partly controlled by the rate of flow of the gas; the more gas that passes over the hot region (404), the more heat that gets dissipated. That is, when the vent door (412) is completely open, there is maximum cooling or heat dissipation.

The vent door (412) need not be made out of any particular material. For example, the vent door (412) could be made out of a conductive or insulating material. For example, sheet metal or engineering polymers may be used. Suitable knobs were described above, as were materials and dimensions suitable for the hot and cold regions.

FIG. 4B illustrates a control system (422) having a fixed temperature set point. As shown in FIG. 4B, the system comprises a refrigeration device (424), and a controller (430). The refrigeration device (424) comprises a hot region (426), a cold region (428), and a TEM (430) positioned between the two and in thermal contact therewith. The controller (430) comprises a vent door (432), a housing (434), a thermostatic valve (436), and a securing screw (428).

The control system (422) of FIG. 4B illustrates a system similar to that of the control system (400) of FIG. 4A, however, in FIG. 4B, the temperature of the system is regulated, at least inpart, by thermal expansion of a thermostatic valve (436). That is, whereas the system of FIG. 4A is user controlled and operates only upon relative temperatures, the system of FIG. 4B is automatically controlled about a range of temperatures, which are typically determined by the selection of the thermostatic valve. The thermostatic valve shown in FIG. 4B and 4C is a bimetal-type, however any thermostatic valve may be used. As th thermostatic valve (436) expands, it pushes on a connecting element (here shown as a rod) attached to vent door (432), thereby causing the vent door to close.

Another variation of the control systems described herein is illustrated in FIG. 4C, which depicts a user adjustable control system (444) adjustable about a fixed temperature set point. As shown in FIG. 4C, the control system comprises a refrigeration device (446), and a controller (454). The refrigeration device (446) comprises a hot region (448), a cold region (450), and a TEM (452) positioned between the two and in thermal contact therewith. The controller (454) comprises a vent door (456), a housing (458), a thermostatic valve (462), and a securing screw (460). Also shown in a user adjustment knob (468).

The adjustment knob (468) controls the vent door (456) and therefore allows a user to adjust the temperature of the system within a set range of temperatures, the range typically determined by the selection of the thermostatic valve used (462). As noted above, the adjustment knob (468) may be any acceptable knob. Similarly, a securing screw (460) may be made out of any suitable material, for e.g., the same material used to make securing screws (130) and (150) and (356).

The control system and controllers described herein may be used to regulate the temperature of a heating and/or cooling device and therefore a thermal exchange surface. Moreover, these controllers have many advantages not realized by other controllers, particularly electric controllers. The controllers described herein allow a user to regulate the temperature of a heating or cooling device without having to regulate the electrical power supplied to the device. Heating devices which are not regulated by controlling the input electrical power may have a constant input power, or an unregulated input power.

Although illustrative variations of the systems and controllers have been described above, it will be evident to a skilled artisan that various changes and modifications may be made without departing from the true scope and spirit of the systems and controllers described above and herein claimed. The various examples are, therefore, to be considered in all respects as illustrative and not restrictive.

What I claim is:

1. A system for regulating the temperature of a heating or cooling device without adjusting the input power, comprising:
  a heating or cooling device comprising a cold region, a hot region, and an input power, there being a temperature difference between the cold region and the hot region; and
  a controller comprising a heat transfer pathway in thermal contact with at least a portion of the cold region and at least a portion of the hot region, the heat transfer pathway configured to create a path for heat exchange between the portion of contacted hot region and the portion of contacted cold region, whereby the heat transfer pathway is controlled to regulate the temperature of one of the regions, resulting in a controlled region and a non-controlled region, and wherein the heat transfer pathway comprises a fluid circuit, said fluid circuit comprising a channel with a fluid therethrough, an adjustable valve for controlling the path of the fluid in the fluid circuit, wherein the adjustable valve is electrically actuated, comprises a thermistor, or is actuated with a solenoid.

2. The system of claim 1 wherein the input power to the heating or cooling device is constant.

3. The system of claim 1 further comprising a thermostatic valve, wherein the thermostatic valve is configured to regulate the temperature of the controlled region.

4. The system of claim 3 wherein the heat exchange between the non-controlled region and the controlled region is regulated, at least in part, by thermal expansion of the thermostatic valve.

5. The system of claim 3 wherein the thermostatic valve is thermally insulated from the non-controlled region.

6. The system of claim 3 wherein the heat transfer pathway is modified, at least in part, by thermal expansion of the thermostatic valve.

7. The system of claim 3 wherein the thermostatic valve is configured to be in thermal contact with at least a portion of the controlled region.

8. The system of claim 3 wherein the thermostatic valve comprises a wax.

9. The system of claim 3 wherein the thermostatic valve comprises a bimetal.

10. The system of claim 3 wherein the thermostatic valve comprises a liquid filled actuator.

11. The system of claim 3 wherein the thermostatic valve comprises a spring or coil.

12. The system of claim 3 wherein the temperature of the controlled region is automatically controlled.

13. The system of claim 1 wherein the temperature of the controlled region is user adjustable.

14. The system of claim 1 wherein the heating or cooling device comprising a thermoelectric module.

15. A system for regulating the temperature of a heating or cooling device without adjusting the input power, comprising:
   a heating or cooling device comprising a cold region, a hot region, and an input power, there being a temperature difference between the cold region and the hot region; and
   a controller comprising a fluid circuit in thermal contact with at least a portion of the cold region and at least a portion of the hot region, the fluid circuit configured to create a path for heat exchange between the portion of contacted hot region and the portion of contacted cold region, and a thermostatic valve configured to regulate the heat exchange between the cold region and the hot region, resulting in a controlled region and a non-controlled region, and wherein the heat transfer pathway comprises a fluid circuit, said fluid circuit comprising a channel with a fluid therethrough, an adjustable valve for controlling the path of the fluid in the fluid circuit, wherein the adjustable valve is electrically actuated, comprises a thermistor, or is actuated with a solenoid.

16. A controller for regulating the temperature of a heating or cooling device comprising:
   a heat transfer pathway, the heat transfer pathway configured to be placed in thermal contact with at least a portion of the cold region of a heating or cooling device and at least a portion of the hot region of a heating or cooling device, the heat transfer pathway further configured to create a path for heat exchange between the portion of contacted hot region and the portion of contacted cold region, whereby the heat transfer pathway is controlled to regulated the temperature of one of the regions, resulting in a controlled region and a non-controlled region, and wherein the heat transfer pathway comprises a fluid circuit, said fluid circuit comprising a channel with a fluid therethrough, an adjustable valve for controlling the path of the fluid in the fluid circuit, wherein the adjustable valve is electrically actuated, comprises a thermistor, or is actuated with a solenoid.

17. A method of controlling the temperature of a heating or cooling device without adjusting the input power, comprising: providing a heating or cooling device comprising a cold region, a hot region, and an input power; providing a heat transfer pathway in thermal contact with at least a portion of the cold region and at least a portion of the hot region, the heat transfer pathway configured to create a path for heat exchange between the portion of contacted hot region and the portion of contacted cold region; regulating the heat transfer pathway to control the heat exchanged between the regions, so that the temperature of one of the regions is controlled, and wherein the heat transfer pathway comprises a fluid circuit, said fluid circuit comprising a channel with a fluid therethrough, an adjustable valve for controlling the path of the fluid in the fluid circuit, wherein the adjustable valve is electrically actuated, comprises a thermistor, or is actuated with a solenoid.

18. A method of controlling the temperature of a heating or cooling device without adjusting the input power, comprising: providing a heating or cooling device comprising a cold region, a hot region, and an input power; providing a fluid circuit comprising a channel with fluid therethrough, said fluid circuit in thermal contact with at least a portion of the cold region and at least a portion of the hot region, the fluid circuit configured to create a path for heat exchange between the portion of contacted hot region and the portion of contacted cold region; providing a thermostatic valve for modifying the path and flow rate of the fluid in at least a region of the fluid circuit; regulating the fluid circuit with at least the thermostatic valve to control the heat exchanged between the cold region and the hot region, so that the temperature of one of the regions is controlled.

* * * * *